United States Patent
Nakayama et al.

(10) Patent No.: US 6,848,916 B2
(45) Date of Patent: Feb. 1, 2005

(54) ELECTRICAL JUNCTION BOX

(75) Inventors: Makoto Nakayama, Shizuoka (JP); Akinori Saneto, Shizuoka (JP); Hironori Saito, Kanagawa (JP); Tetsu Kaneko, Kanagawa (JP)

(73) Assignees: Yazaki Corporation, Tokyo (JP); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/627,627

(22) Filed: Jul. 28, 2003

(65) Prior Publication Data

US 2004/0055775 A1 Mar. 25, 2004

(30) Foreign Application Priority Data

Jul. 29, 2002 (JP) ..................... P 2002-219753
Aug. 8, 2002 (JP) ..................... P 2002-231930

(51) Int. Cl.[7] ............................................. H01R 12/00
(52) U.S. Cl. ................... 439/76.2; 439/949; 174/50; 361/752
(58) Field of Search ................ 439/76.2, 949; 174/50, 52.1, 58; 361/752, 736, 641, 644, 833

(56) References Cited

U.S. PATENT DOCUMENTS

| | | | | |
|---|---|---|---|---|
| 5,067,905 A | * | 11/1991 | Matsumoto et al. ....... | 439/76.2 |
| 5,915,978 A | * | 6/1999 | Hayakawa et al. ........ | 439/76.2 |
| 6,062,876 A | * | 5/2000 | Oda .......................... | 439/76.2 |
| 6,152,758 A | * | 11/2000 | Matsuoka ................... | 439/364 |
| 6,515,226 B2 | * | 2/2003 | Chiriku et al. ............... | 174/50 |
| 6,524,136 B2 | * | 2/2003 | Kawaguchi et al. ........ | 439/621 |
| 6,570,088 B1 | * | 5/2003 | Depp et al. .................. | 174/50 |
| 6,573,448 B2 | * | 6/2003 | Mayer et al. .............. | 174/52.3 |
| 6,600,658 B2 | * | 7/2003 | Iwata ......................... | 361/752 |
| 6,683,950 B1 | * | 1/2004 | Harwood et al. ...... | 379/413.02 |
| 6,707,689 B2 | * | 3/2004 | Momota et al. ............ | 361/833 |
| 6,736,648 B2 | * | 5/2004 | Terunuma et al. ......... | 439/76.2 |

FOREIGN PATENT DOCUMENTS

| | | |
|---|---|---|
| JP | 1-114318 | 5/1989 |
| JP | 1-122313 | 5/1989 |
| JP | 1-221876 | 9/1989 |
| JP | 11-215649 | 8/1998 |
| JP | 10-242677 | 9/1998 |
| JP | 10-243529 | 9/1998 |
| JP | 11-18246 | 1/1999 |
| JP | 11-41752 | 2/1999 |

* cited by examiner

*Primary Examiner*—Gary Paumen
(74) *Attorney, Agent, or Firm*—Finnegan, Henderson, Farabow, Garrett & Dunner, L.L.P.

(57) ABSTRACT

An electrical junction box comprises a junction box body and a cover which houses and holds the junction box body. A guide rail groove is provided on any one of an inner surface of the cover and an outer surface of the junction box body, and a guide rail guided by the guide rail groove is provided on the other thereof. Further, the junction box body is held in the cover at a slant with respect to the guide rail and the guide rail groove.

8 Claims, 14 Drawing Sheets

ELECTRICAL JUNCTION BOX

BACKGROUND OF THE INVENTION

1. Field of the Invention

The present invention relates to an electrical junction box in which a junction box body is freely housed and drawn out by sliding against a cover.

2. Description of the Related Art

There is the earlier technology shown in FIG. 1 as the subject type of electrical junction box. As shown in FIG. 1, this electrical junction box 1 includes a waterproof cover 2 located, for example, within an engine compartment. The waterproof cover 2 is constituted by a lower cover 2a and an upper cover 2b. The lower cover 2a is fixed to a vehicle body (not shown). The upper cover 2b covers the top opening of the lower cover 2a and is provided so as to be freely detachable from the lower cover 2a. On the mutually opposed inner sides of the lower cover 2a, a pair of guide rail grooves 3 is provided, and a pair of guide rails 5 of a junction box body 4 is engaged with the guide rail grooves 3.

One surface of the junction box body 4 is formed as a maintenance surface 4a, on which a fuse, a relay, a connector and the like are mounted. The junction box body 4 slides in a vertical direction S because the pair of guide rail grooves 3 of the lower cover 2a guides a pair of rails 5. Due to this sliding movement, the junction box body 4 is provided so as to be freely inserted to and drawn out from the lower cover 2a.

Meanwhile, a peripheral part 6 is located in an appropriate position in the periphery of the electrical junction box 1 as illustrated in FIG. 1. Therefore, there is a limitation on a range where a maintenance inspector can view the maintenance surface 4a, and thus the orientation of the junction box body 4 is set so as to be perpendicular to a viewing direction A. By setting the orientation of the junction box body 4 in this way, it becomes possible to view the maintenance surface 4a in a position where the junction box body 4 is drawn out from the lower cover 2a. This makes it easier for the maintenance inspector to view the maintenance surface 4a and to conduct a replacement of a fuse or the like.

SUMMARY OF THE INVENTION

However, the periphery part 6 varies depending on the model and grade of the vehicle, the installation position of the electrical junction box 1, or the like. Accordingly, the viewing direction A with respect to the junction box body 4 drawn out from the lower cover 2a also varies. It is thus necessary for the junction box body 4 to change the orientation thereof corresponding to the viewing direct on. For example, when a periphery part 7 is present as in FIG. 1, the viewing direction A of the maintenance inspector is altered to a direction B. Therefore, an appropriate measure has been required for changing the orientation of the junction box body 4 in order to correspond to the viewing direction changes.

The present invention was made in consideration of the above-described problems. It is an object of the present invention to provide an electrical junction box in which the orientation of a junction box body can be easily changed to a desired orientation.

According to one aspect of the present invention, there is provided an electrical junction box, comprising: a junction box body; and a cover which houses and holds the junction box body, wherein a guide rail groove is provided on any one of an inner surface of the cover and an outer surface of the junction box body, and a guide rail guided by the guide rail groove is provided on the other thereof; and the junction box body is held in the cover at a slant with respect to the guide rail and the guide rail groove.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, description will be made of embodiments of the present invention with reference to the drawings.

A first embodiment will be described with reference to FIGS. 2 to 10.

As shown in FIGS. 2 to 5, an electrical junction box 10 is located within an engine compartment (not shown). Periphery parts including a cowl top 11 and a relay box 12 are located around the electrical junction box 10. The cowl top 11 is located at a position over the electrical junction box 10. Therefore, the front area of a junction box body 14 in a drawing-out direction is restricted to a given dimension due to the cowl top 11. The relay box 12 is provided adjacent to the electrical junction box 10 and protrudes slightly beyond the top surface of the electrical junction box 10. The space between the relay box 12 and cowl top 11 is the only space that can be used for maintenance inspection of the electrical junction box 10. A direction in which a maintenance inspector views through this space is regarded as a viewing direction D toward the junction box body 14.

Figure 6:
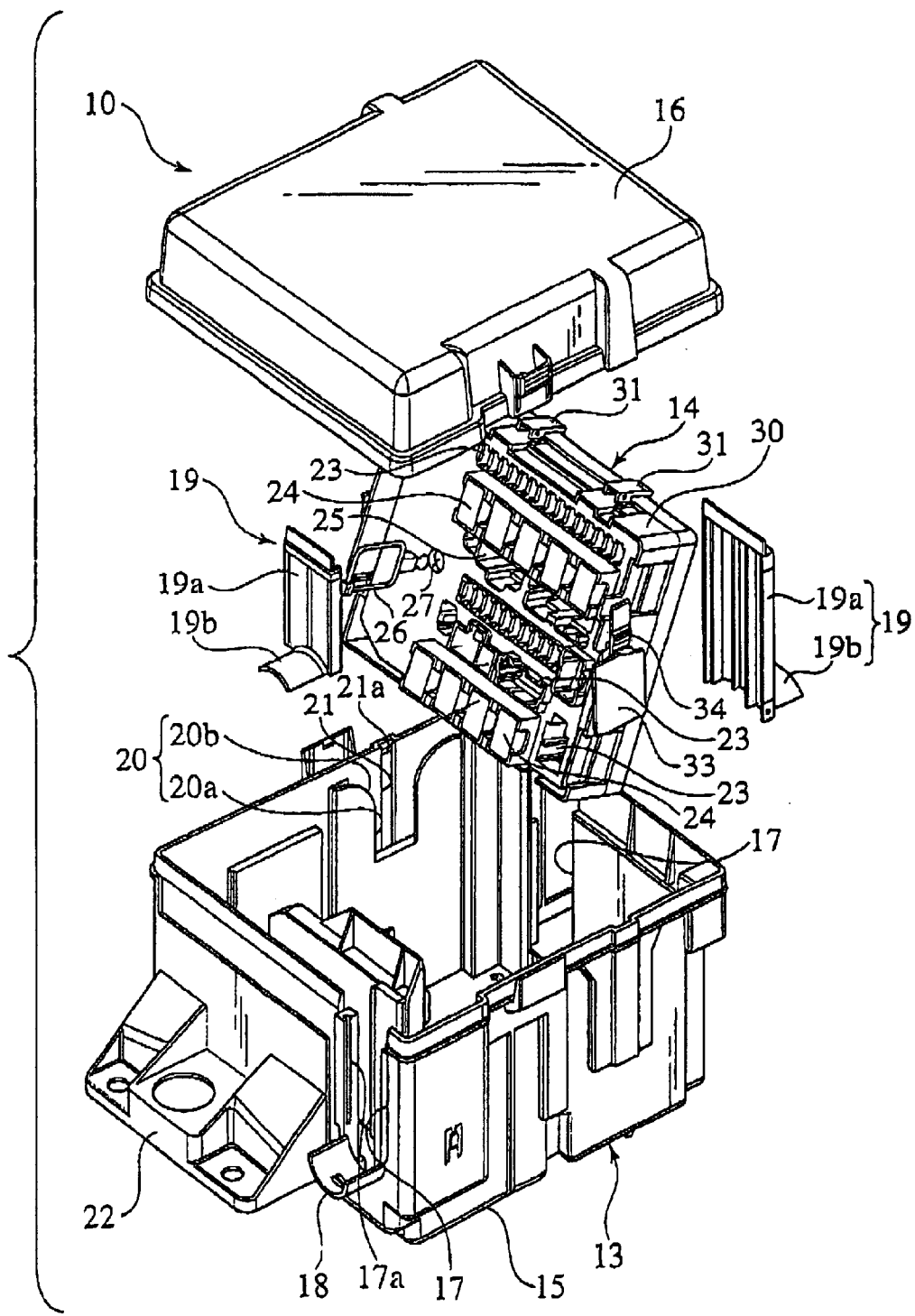
FIG. 6 is an exploded perspective view of the electrical junction box of the first embodiment according to the present invention.

As shown in FIG. 6, main components of the electrical junction box 10 are a waterproof cover 13 and the junction box body 14. The waterproof cover 13 has an approximately rectangular shape and is made of synthetic resin, and the junction box body 14 made of synthetic resin is housed inside the waterproof cover 13.

The waterproof cover 13 is fixed to a vehicle body (not shown), and includes a lower cover is and an upper cover 16. The lower cover 15 has a rectangular shape and the top surface thereof is entirely open. The upper cover 16 covers the top surface of the lower cover 15 and is provided so as to be freely detachable from the lower cover 15. There are notches for harnesses 17, respectively formed at two places in the lower cover 15. The top ends of the notches 17 are opened, and the bottom ends of the notches 17 are respectively provided with lower harness protecting walls 18, each protruding in a semicircular shape. Sliding-and-engaging grooves 17a are respectively formed in the bilateral surfaces of the notch 17. Auxiliary sliding covers 19 are provided so as to be freely slidable by being engaged with respective sliding-and-engaging grooves 17a.

Each of the auxiliary sliding covers 19 includes a plate part 19a and an upper harness protection wall 19b. The plate part 19a covers the notch 17 where a wire harness WH is inserted, and areas except for a harness housing space in the lower harness protection wall 18. The upper harness protection wall 19b has a semicircular shape and is provided to integrally protrude at the bottom end of the plate part 19a. These lower and upper harness protection walls 18 and 19b form an approximately cylindrical harness insertion slot, through which one end of each wire harness WH is housed within the waterproof cover 13. The harness insertion slots in two places at the front and back are positioned on the side of a maintenance surface 14a and the opposite surface side thereof, respectively, with respect to the junction box body 14.

Figure 10:
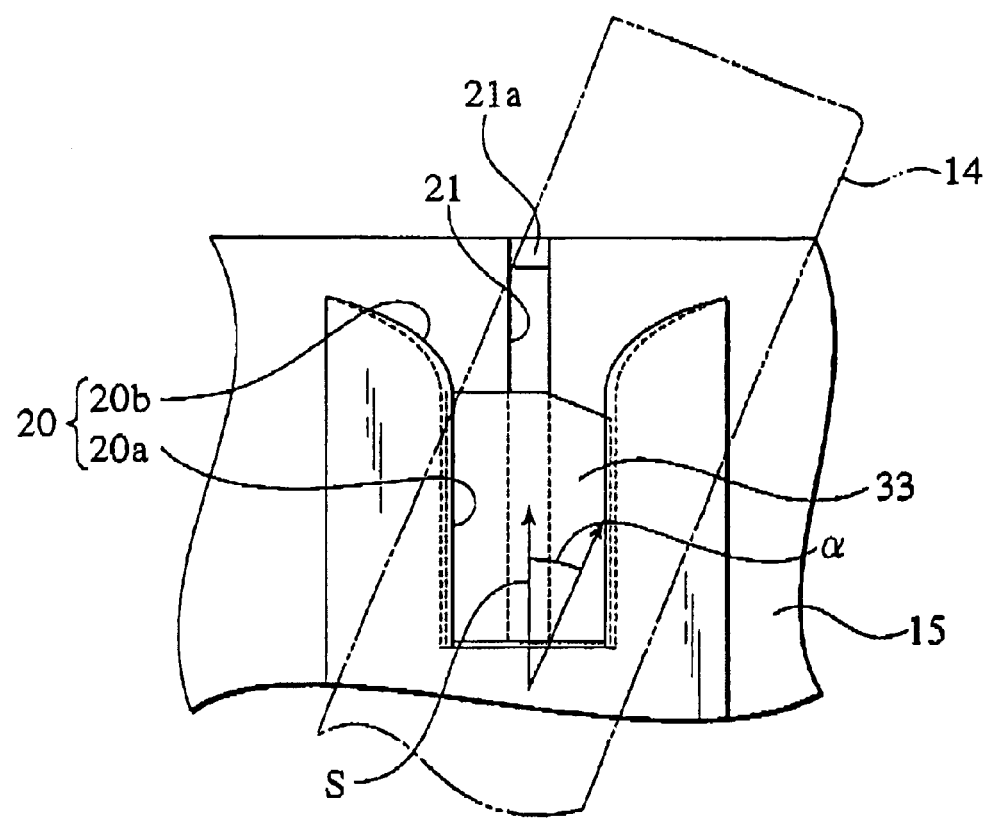
FIG. 10 is a side view illustrating an engagement state of a guide rail groove within the lower cover and a guide rail of a frame according to the first embodiment.
Figure 11:
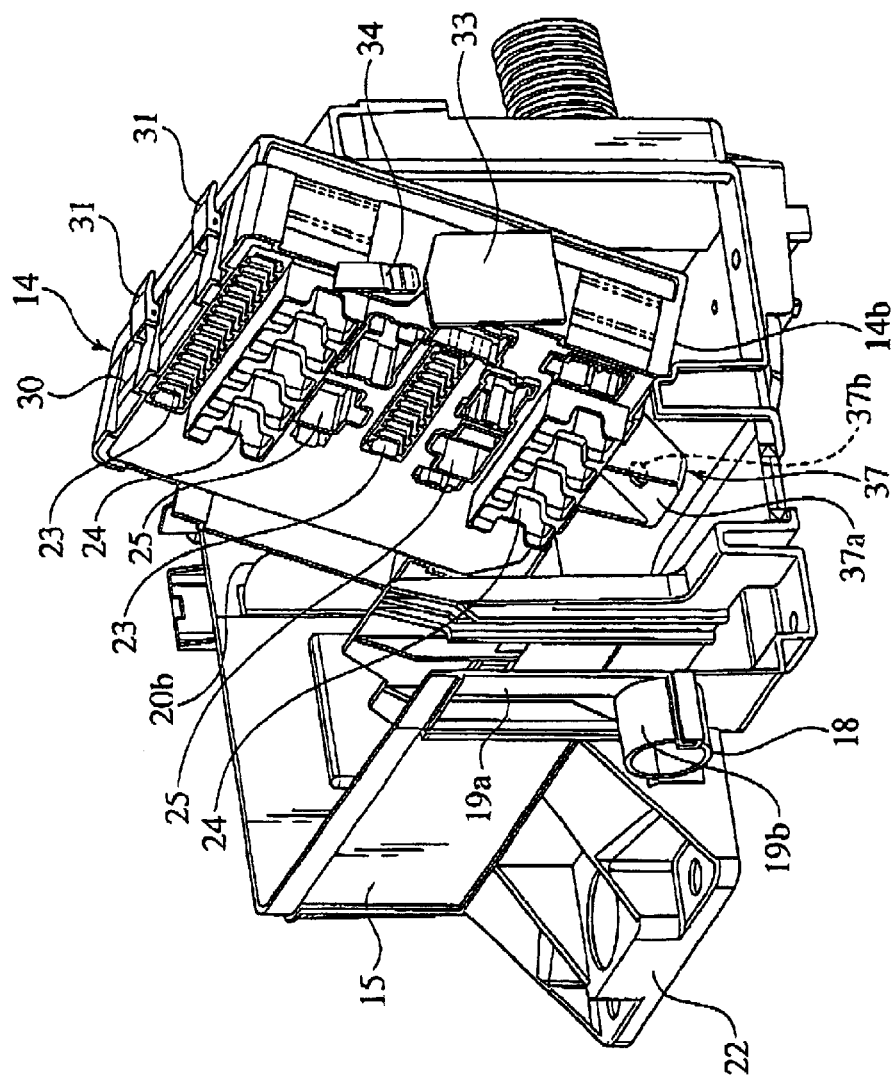
FIG. 11 is a perspective view illustrating a housed junction box body of an electrical junction box of the second embodiment according to the present invention.

Moreover, a pair of guide rail grooves 20 is provided on the mutually opposed inner sides of the lower cover 15. As shown in FIG. 10, the pair of guide rail grooves 20 respectively include a straight groove part 20a extending in a vertical direction and a curved groove part 20b having a circular arc shape, in which the inlet is gradually enlarged. In addition, locking grooves 21 are formed in the inner sides of the guile rail grooves 20, respectively. A latching projection 21a is provided in the vicinity of the inlet of each of the locking grooves 21.

As shown in FIG. 6, a bracket 22 is provided, protruding on the front side of the lower cover 15. The relay box 12 is fixed using this bracket 22.

Figure 7:
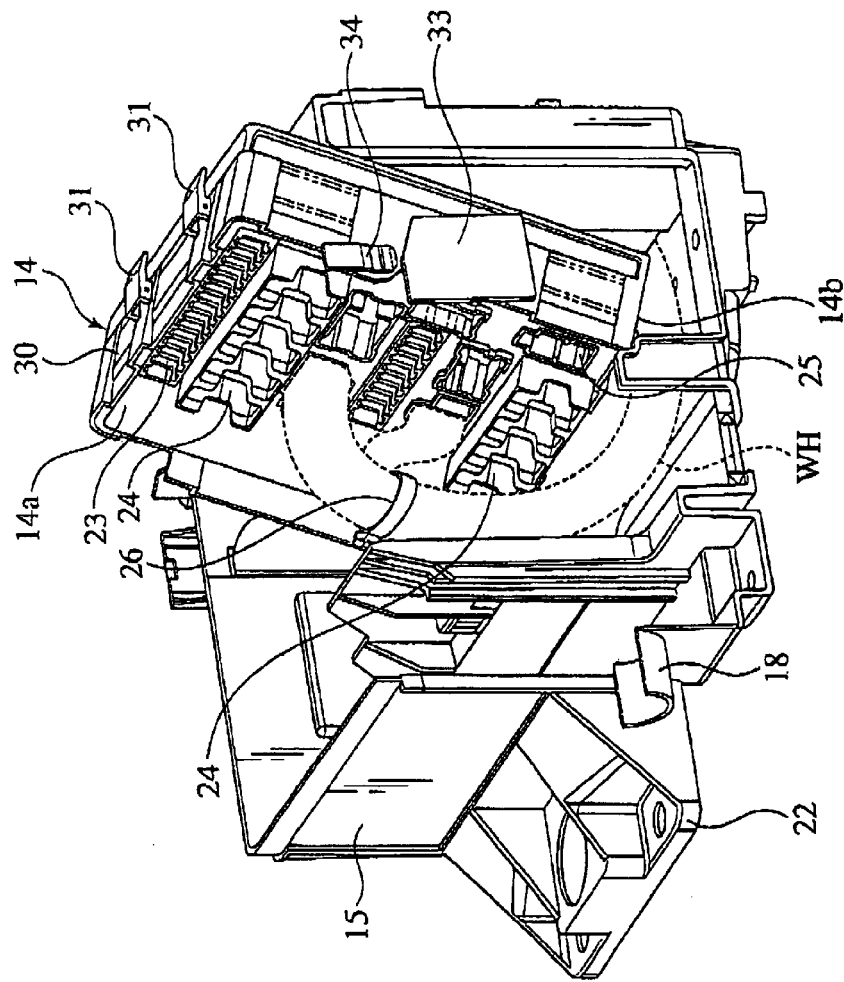
FIG. 7 is a perspective view illustrating the housed junction box body of the electrical junction box of the first embodiment according to the present invention.
Figure 8:
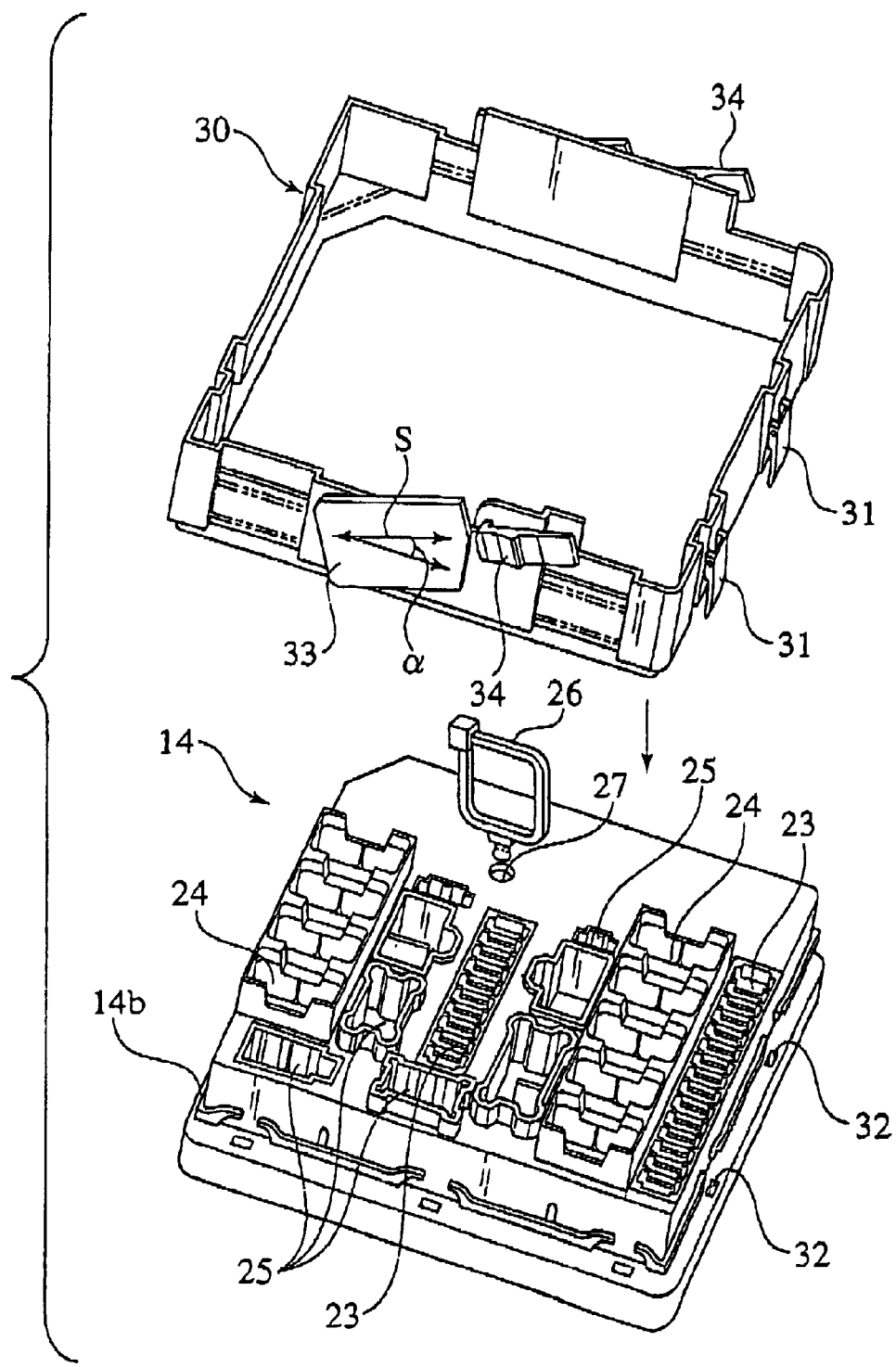
FIG. 8 is an exploded perspective view of the junction box body of the electrical junction box of the first embodiment according to the present invention.

As shown in FIGS. 7 and 8, the junction box body 14 has a flat rectangular parallelepiped shape, and the surface on the front side thereof is formed as the maintenance surface 14a. The maintenance surface 14a is provided with multiple fuse mounting parts 23, relay mounting parts 24, and connector mounting parts 25. The fuse mounting parts 23 are arrayed in a row, forming a group, and these groups are located at two places. Each of the rows extends in a horizontal direction of the junction box body 14. Further, the relay mounting parts 24 are arrayed in a row, forming a group, and these groups are located at two places. Each of the rows extends in a horizontal direction of the junction box body 14.

There is an area in a part of the maintenance surface 14a where the fuse mounting parts 23, relay mounting parts 24, and connector mounting parts 25 are not located. In this area, a harness clip 26 is provided as a wire harness fixing mechanism, and a harness fixing hole 27 is formed, to which the harness clip 26 is attached in a freely detachable manner.

Figure 9A:
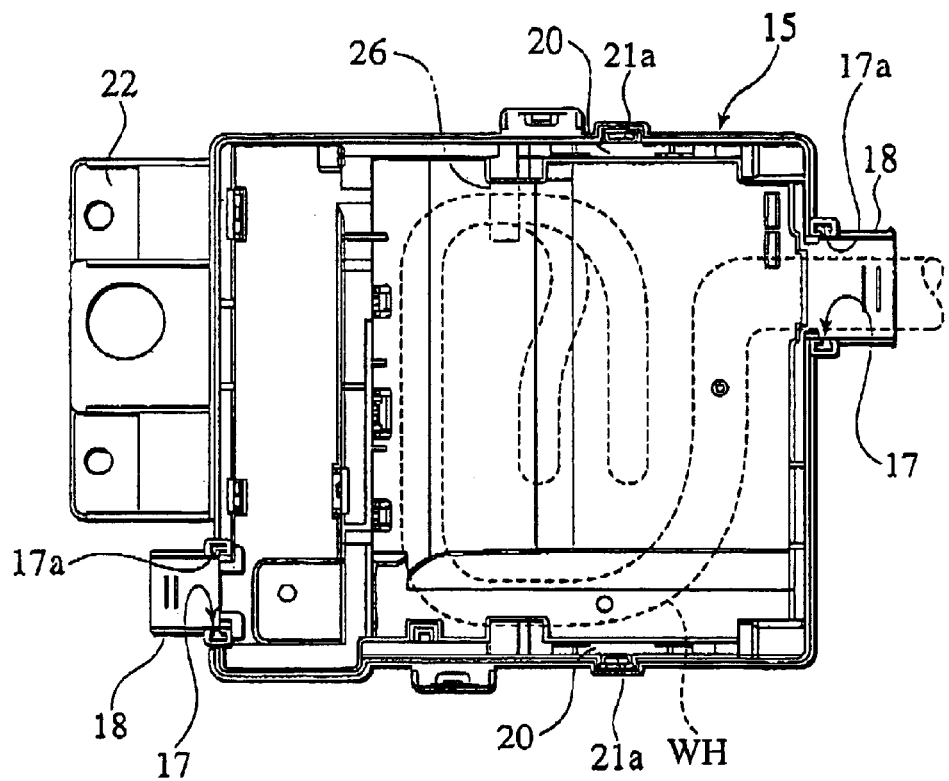
FIG. 9A is a plan view illustrating the state of a wire harness housed within the lower cover according to the first embodiment.
Figure 9B:
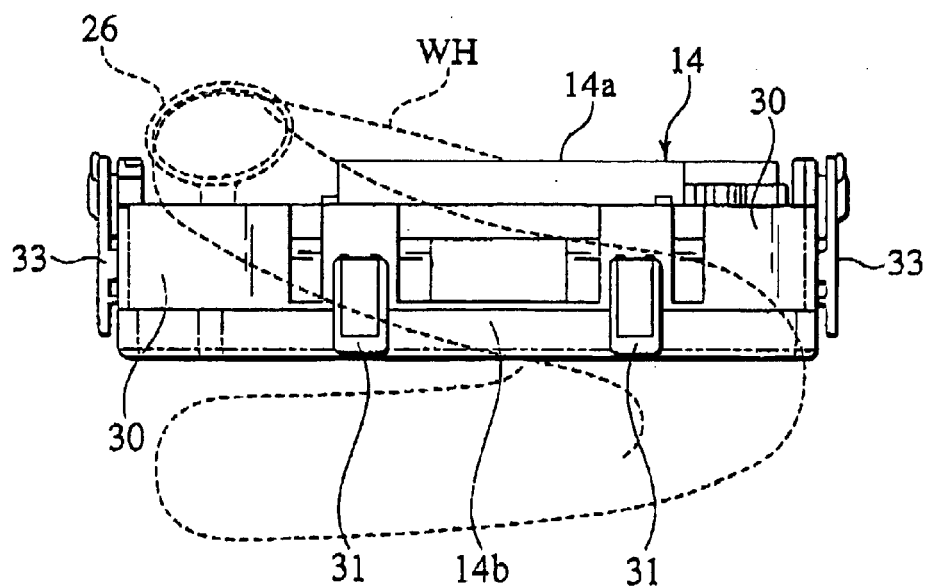
FIG. 9B is a rear view illustrating the state of the junction box body in which the wire harness is fixed according to the first embodiment.

The wire harness WH is attached to the junction box body 14 through the harness clip 26, and thereby the routing path of the wire harness WH within the waterproof cover 13 is restricted. Brief description of the routing path of the wire harness WH is as follows. As illustrated in FIGS. 9A and 9B, the wire harness WH which is mounted on the connector mounting part 25 is inserted from the harness insertion slot positioned on the side of the surface opposed to the maintenance surface 14a. The wire harness WH passes through a space on the side opposed to the maintenance surface 14a and is led to the side of the maintenance surface 14a from the side of the rear surface 14b. The branched ends of the wire harness WH are connected to the connector mounting parts 25, respectively. The wire harness WH routed in this way is fixed on the side of the junction box body 14 using the harness clip 26, thereby restricting the routing path of the wire harness WH on the side of the rear surface 14b in an oblique direction. By restricting the wire harness WH in such routing path as above, the wire harness WH inserted from the harness insertion slot is largely folded on the opposite side of the maintenance surface 14a. Further, the routing path on the side of the maintenance surface 14a leads the wire harness WH to each of the connector mounting parts 25 without passing through a path over the fuse mounting parts 23 and relay mounting parts 24.

As shown in FIG. 8, a frame 30 in a quadrate shape is attached to the circumference of the junction box body 14. The frame 30 has arm locks 31 provided in appropriate places thereof. Each of the arm locks 31 is elastically deformed to be engaged with a projection 32 of the junction box body 14, and thereby the frame 30 is attached to the junction box body 14. A pair of guide rails 33 is provided on the bilateral surface sides of the frame 30. These guide rails 33 are engaged with the guide rail grooves 20 of the lower cover 15. Since guide rails 33 are guided by the guide rail grooves 20, the junction box body 14 can slide within the lower cover 15. By the sliding of the junction box body 14 as above, the junction box body 14 is provided so as to be freely inserted to and drawn out from the lower cover 15. The employed frame 30 has the pair of guide rails 33 at a predetermined inclination angle $\alpha$. Specifically, the inclination of each guide rail 33 is set to the inclination angle $\alpha$ so that the orientation of the maintenance surface 14a becomes perpendicular to a viewing direction D. Accordingly, the maintenance surface 14a is adapted to slide within the lower cover 15 while being slanted at the inclination angle $\alpha$ with respect to a sliding direction S.

Locking projections 34 are provided on the frame 30 in the vicinity of each guide rail. The pair of locking projections 34 is latched to respective latching projections 21*a* of the lower cover 15. Therefore, the junction box body 14 housed in the lower cover 15 is adapted to be locked to the lower cover 15.

Figure 1:
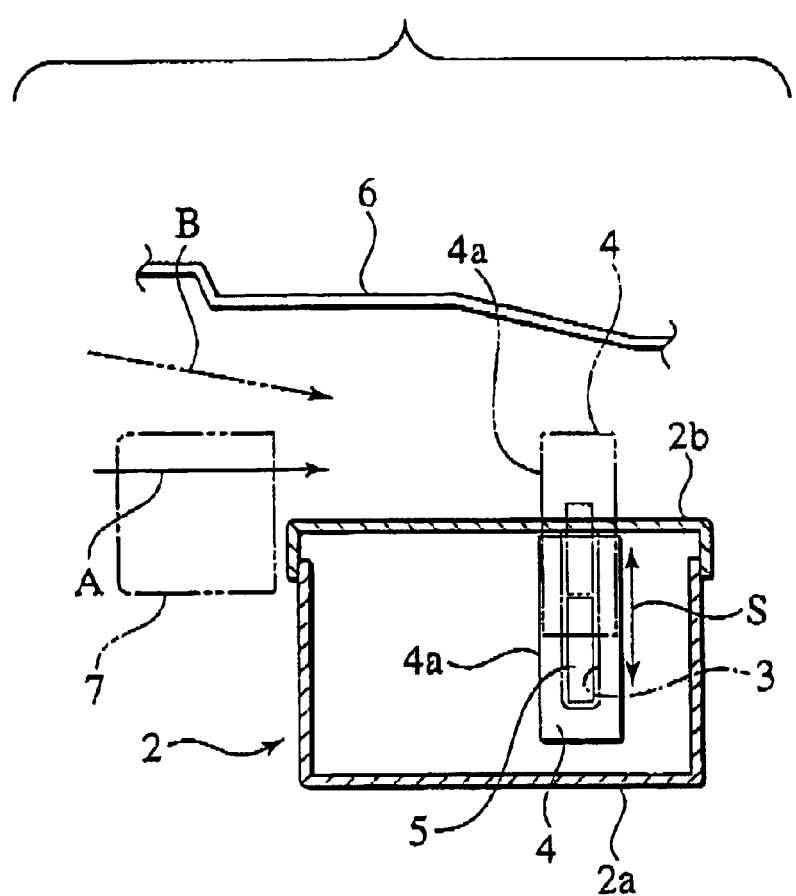
FIG. 1 is a cross-sectional view illustrating an electrical junction box of the earlier technology.
Figure 2:
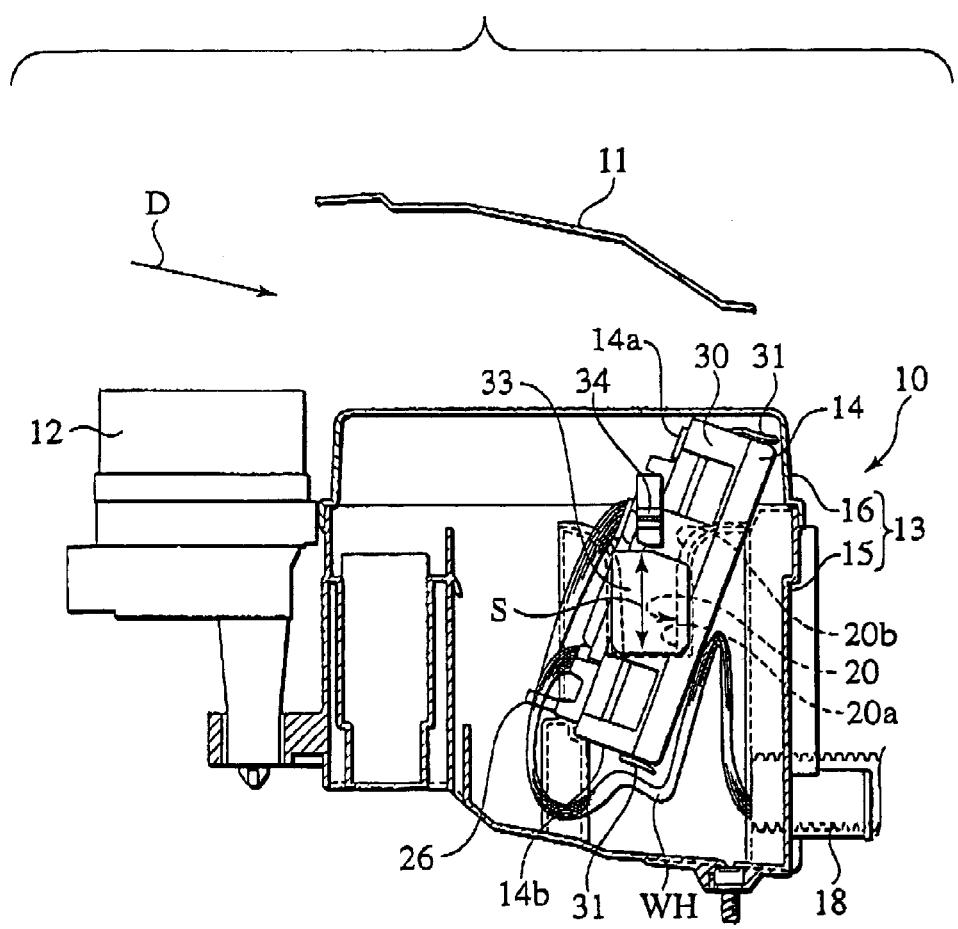
FIG. 2 is a cross-sectional view illustrating an electrical junction box, in which a junction box body is located at a position where the junction box body is housed within a waterproof cover, of the first embodiment according to the present invention.

Next, a maintenance inspection operation for a fuse or the like in the electrical junction box 10 in the foregoing structure will be described. In the state illustrated in FIG. 2, a maintenance inspector removes the upper cover 16 from the lower cover 15. As shown in FIG. 2, the maintenance inspector can view the maintenance surface 14*a* slanted at the inclination angle α with respect to the sliding direction S. Therefore, checking of the fuse condition and replacement of the fuse can be carried out easily by the maintenance inspector.

Figure 3:
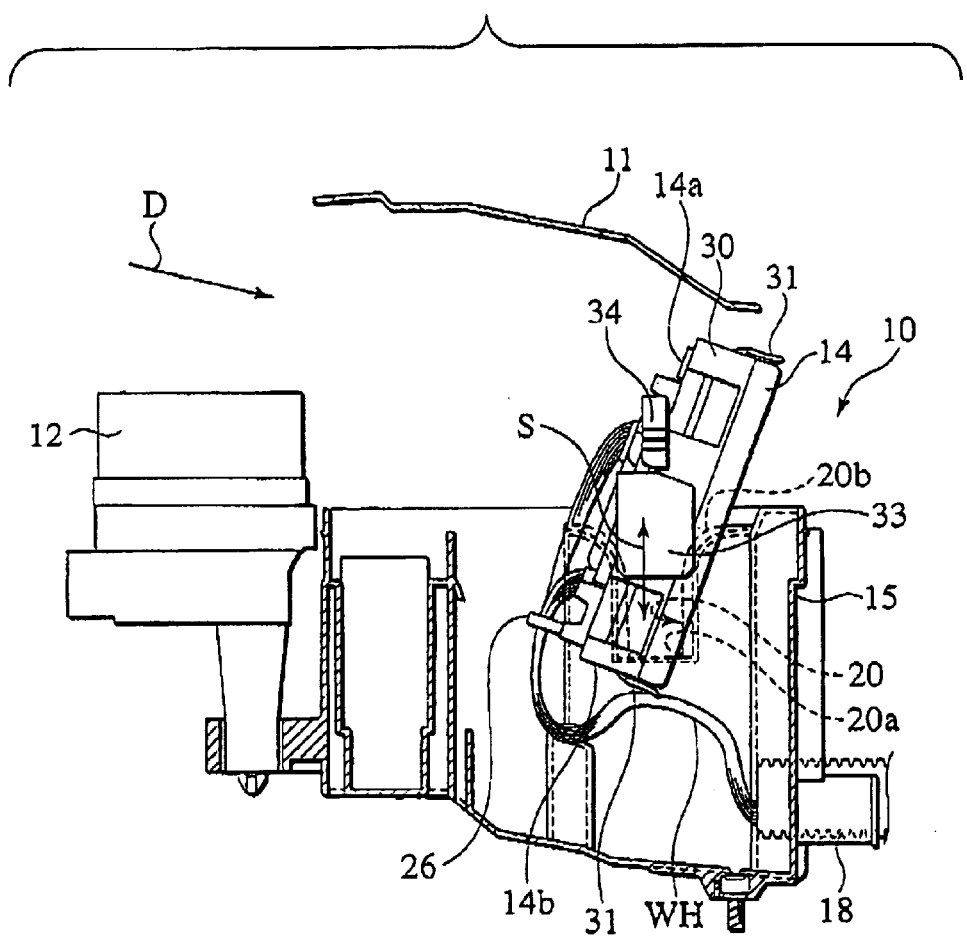
FIG. 3 is a cross-sectional view illustrating the electrical junction box, in which the junction box body is located at a position where the junction box body is drawn out from the waterproof cover, of the first embodiment according to the present invention.

Next, for replacement of a relay, the junction box body or the like, the locks to the lower cover 15 are released, and the junction box body 14 is drawn out from the lower cover 15. This junction box body 14 is drawn out in the sliding direction S because the guide rails 33 are guided by the guide rail grooves 20 of the lower cover 15. As shown in FIG. 3, the junction box body 14 after being drawn out is slanted at the inclination angle α with respect to a sliding direction S. Thus, the maintenance surface 4*a* becomes perpendicular to a viewing direction D. Therefore, as shown in FIG. 3, checking of the fuse condition and replacement of the fuse on the maintenance surface 14*a* can be easily carried out even in the state where the junction box body 14 is drawn out. Further, the orientation of the junction box body 14 in the drawn-out state can be changed by virtue of the curved groove parts 20*b* of the guide rail grooves 20. Therefore, the maintenance inspector can carry out the operation while slanting the junction box body 4 in the orientation at which the operation can be easily conducted.

Figure 4:
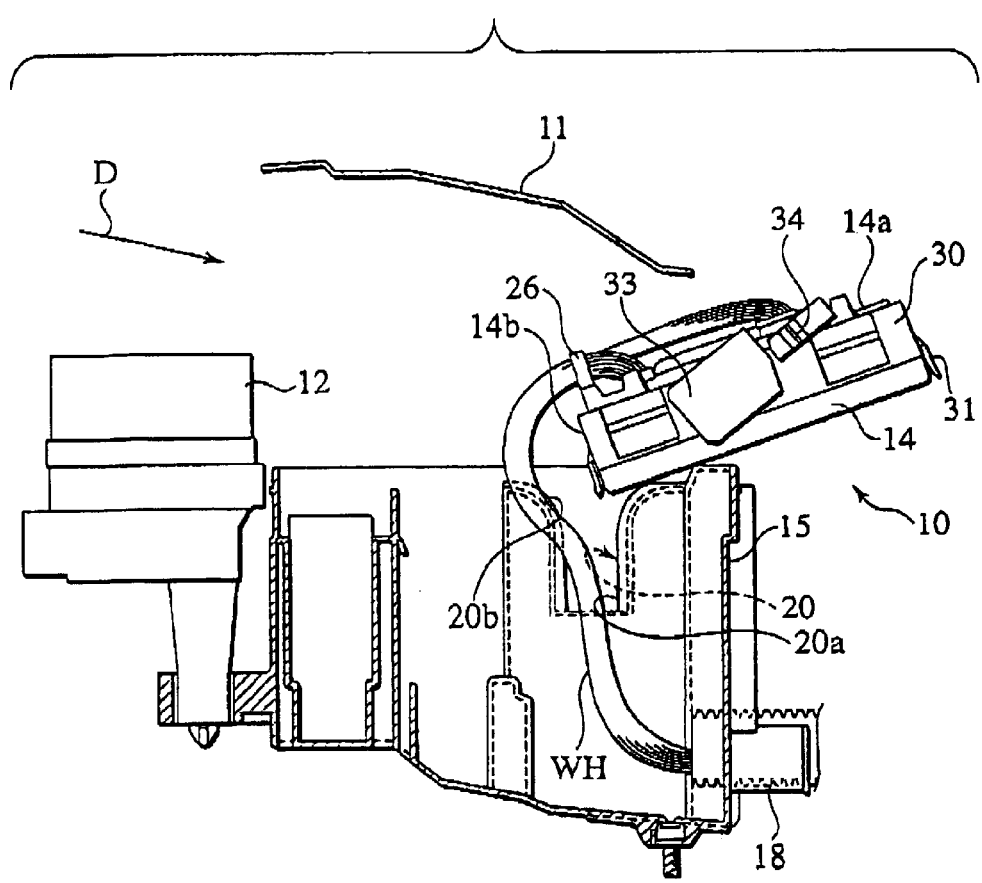
FIG. 4 is a cross-sectional view illustrating the electrical junction box, in which the junction box body is completely drawn out from the waterproof cover, of the first embodiment according to the present invention.

Next, the harness clip 26 is detached from the junction box body 14 which is drawn out from the lower cover 15. The wire harness WH is then released from the routing restriction and becomes free. Here, as shown in FIG. 4, the orientation of the junction box body 14 in the drawn-out state can be changed by the curved groove parts 20*b* as mentioned earlier. Therefore, the maintenance inspector can remove the harness clip 26 while bringing the junction box body 14 to the orientation at which the harness clip 26 can be easily removed.

Figure 5:
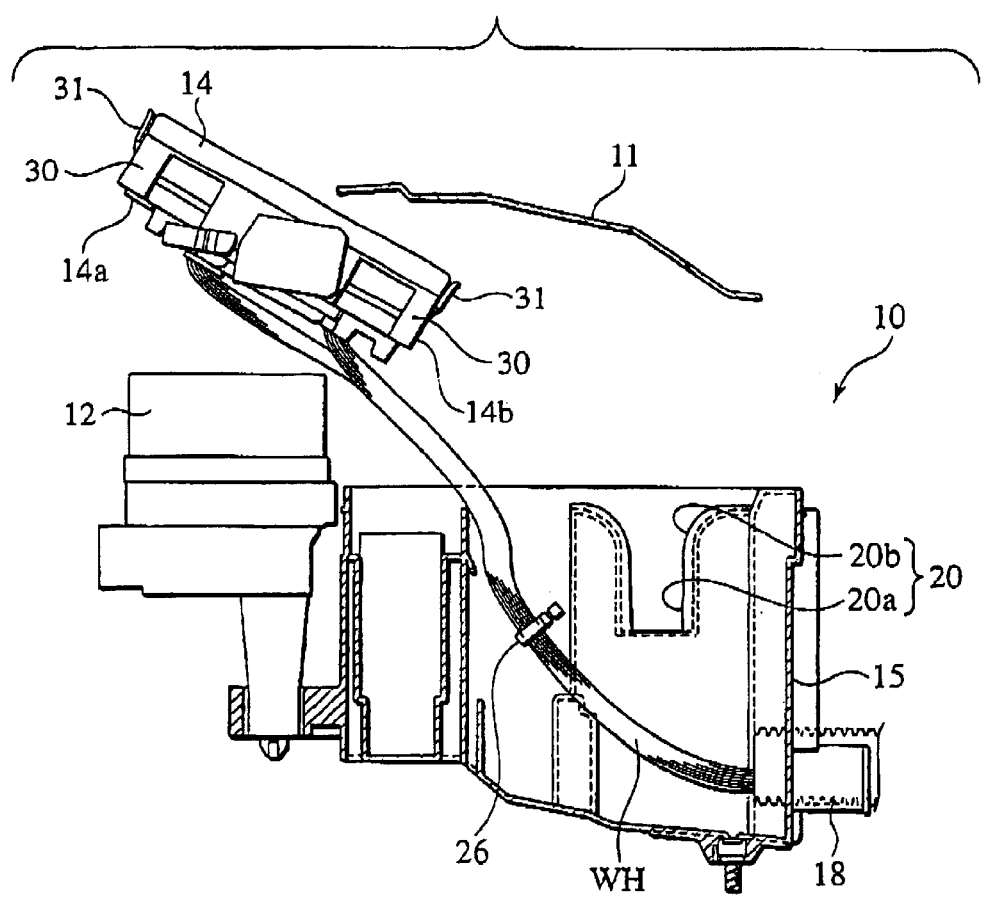
FIG. 5 is a cross-sectional view of the electrical junction box, in the state where the junction box body is completely drawn out from the waterproof cover and moved closer to a maintenance inspector, of the first embodiment according to the present invention.

Next, the junction box body 14 in the drawn-out state is further drawn out from the lower cover 15 while being slanted toward the side of the maintenance inspector, and thereby the junction box body 14 is completely drawn out from the lower cover 15. Thereafter, as shown in FIG. 5, the junction box body 14 being drawn out from the lower cover 15 is moved to a position near the maintenance inspector, and a complicated operation for maintenance inspection such as replacement of a relay or the junction box body is carried out. After the operation is completely finished, the junction box body 14 is replaced to the waterproof cover 13 in the reverse procedure to that mentioned above, and thereby the whole procedure is completed.

Incidentally, the viewing direction D with respect to the junction box body 14 drawn cut from the lower cover 15 varies the position where the electrical junction box 10 is installed, or the like depending on the model and grade of the vehicle. Therefore, the orientation of the maintenance surface 14*a* is required to change corresponding to the viewing direction D. In this electrical junction box 10, the orientation change of the junction box body 14 is realized by replacing the frame 30 with another one having guide rails 33 at a desired inclination angle α. Therefore, the orientation of the maintenance surface 14*a* can be easily changed to the desired orientation without replacing the junction box body 14 itself. Consequently, the inclined orientation of the junction box body 14 can be changed at very low cost.

Furthermore, arm locks 31 are provided in the frame 30. Since each of the arm locks 31 is elastically deformed to engage with a projection 32, the frame 30 is attached to the junction box body 14. Therefore, when the frame 30 fits the circumference of the junction box body 14, the frame 30 is attached to the junction box body 14. Therefore the attachment operation of the frame 30 can be easily conducted.

In the above embodiment, the guide rail grooves 20 are provided on the inner surfaces of the lower cover 15, and the guide rails 33 are provided on the frame 30 of the junction box body 14. However, contrary to this, the guide rails 33 may be provided on the inner surfaces of the lower cover 15, and the guide rail grooves 20 may be provided on the frame 30. In addition, it is certainly possible to provide the guide rail grooves 20 or the guide rails 33 on the junction box body 14 directly, without providing the frame 30 therebetween.

Next, a second embodiment will be described with reference to FIGS. 11 to 14B. With regard to a structure of an electrical junction box of this embodiment, the parts the same as those in the first embodiment are denoted with the same referential numerals to omit duplicated description.

In this embodiment, a harness fixture 35 is provided instead of the harness clip 26 and the harness fixing hole 27 provided in the first embodiment as the wire harness fixing mechanism. The harness fixture 35 as the wire harness fixing mechanism will be described.

Figure 12:
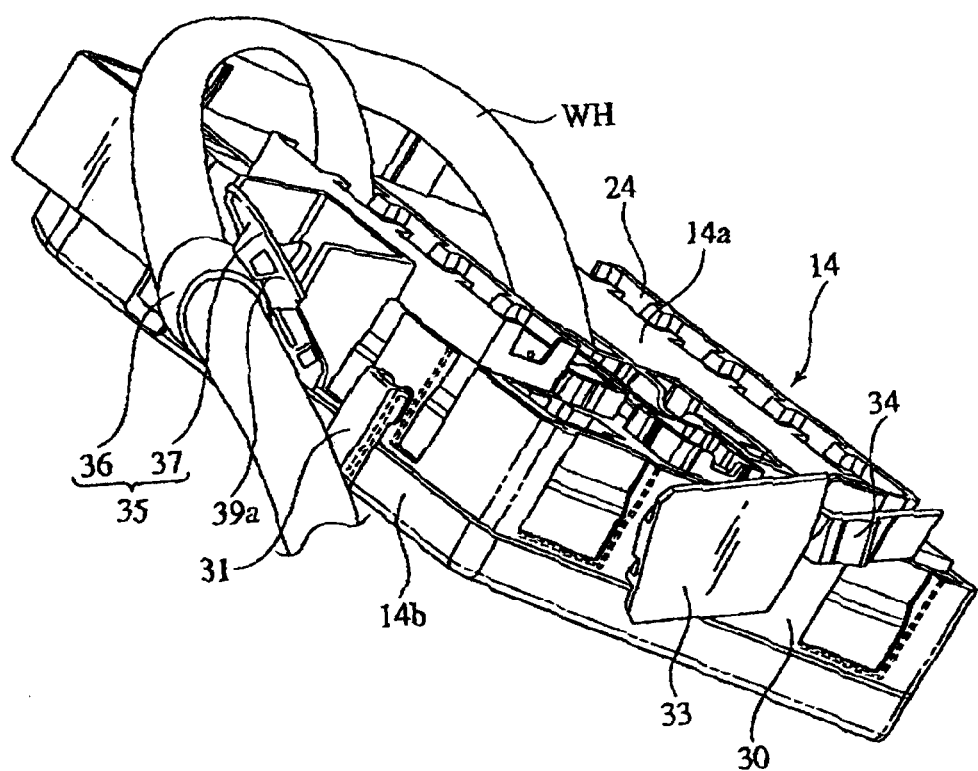
FIG. 12 is a perspective view of the junction box body viewed from a rear surface side with respect to a drawing-out direction according to the second embodiment.
Figure 13:
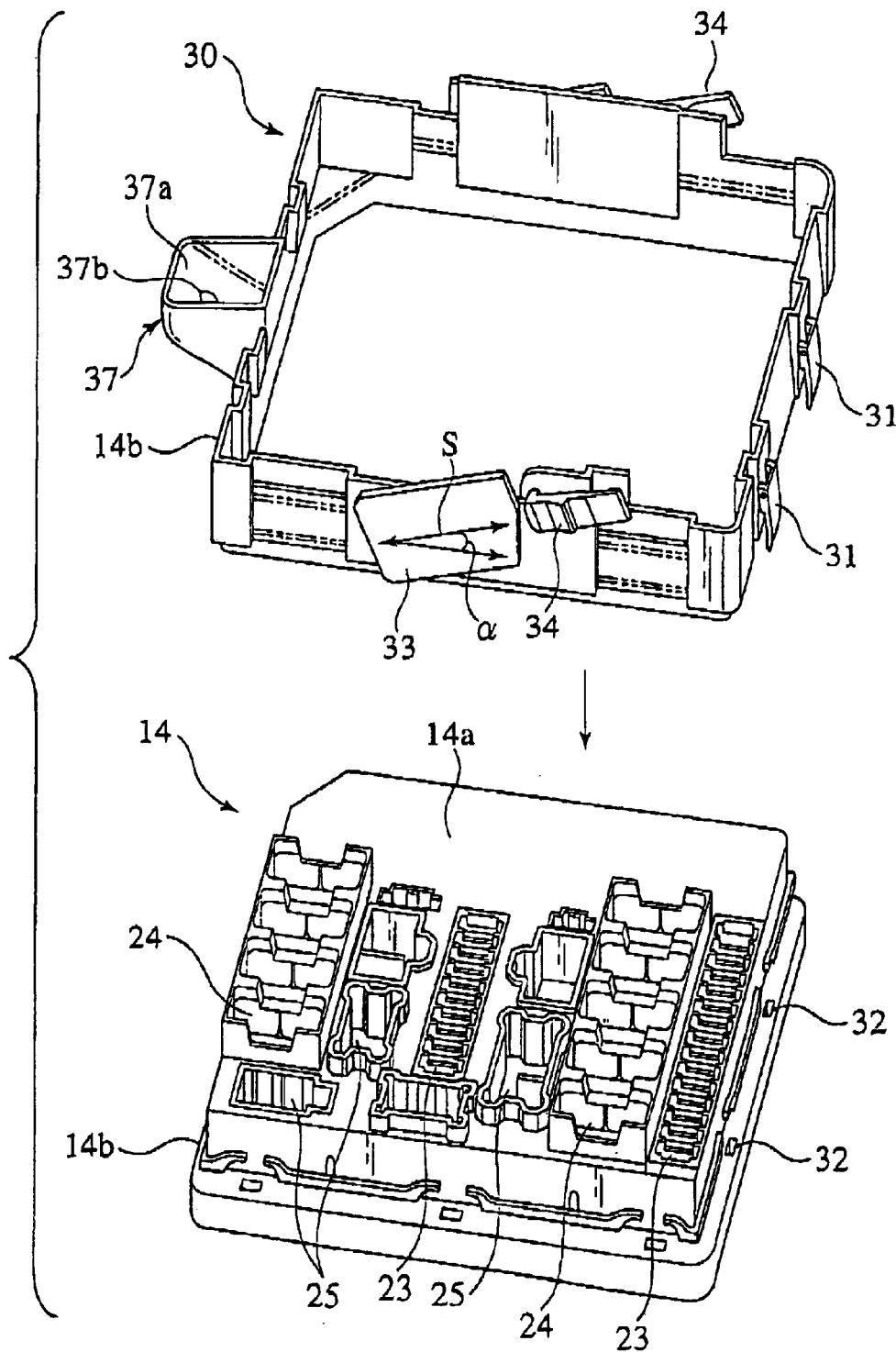
FIG. 13 is an exploded perspective view of the junction box body of the electrical junction box of the second embodiment according to the present invention.

As shown in FIG. 12, a wire harness WH is fixed by the harness fixture 35 on a rear surface 30*b* (a part of a rear surface 14*b*) with respect to a direction in which a frame 30 is drawn out. The harness fixture 35 includes a harness clip 36 which holds the wire harness WH, and the harness fixing part 37 provided to protrude at the center of the rear surface 30*b*. The harness clip 36 is attached to the harness fixing part 37 in a freely detachable manner. The harness clip 36 includes a portion for fastening the bundled wire harness WH, and another portion which is elastically deformable for engagement. The harness fixing part 37 has a harness restricting plate 37*a*, which is slanted in an oblique direction with respect to the rear surface 30*b*. A clip latching hole 37*b* is formed in the harness restricting plate 37*a*. In addition, the harness clip 36 holding the wire harness WH is engaged with the clip latching hole 37*b*, and thereby the wire harness WH is attached on the side of a junction box body 14. Consequently, the routine path of the wire harness WH within a waterproof cover 13 is restricted.

Figure 14A:
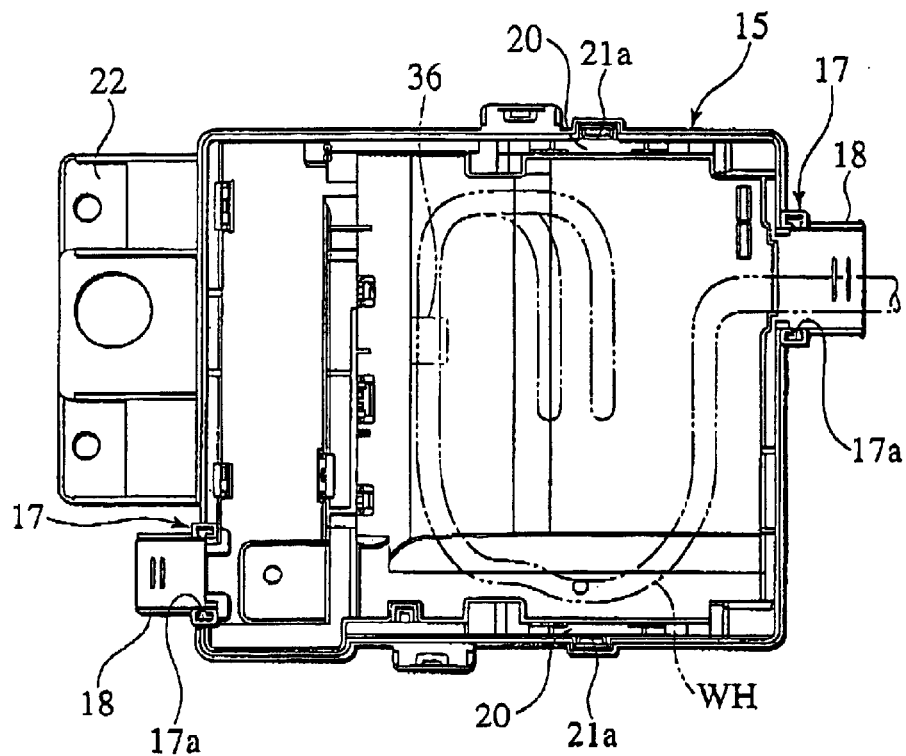
FIG. 14A is a plan view illustrating the state of a wire harness housed within a lower cover according to the second embodiment.
Figure 14B:
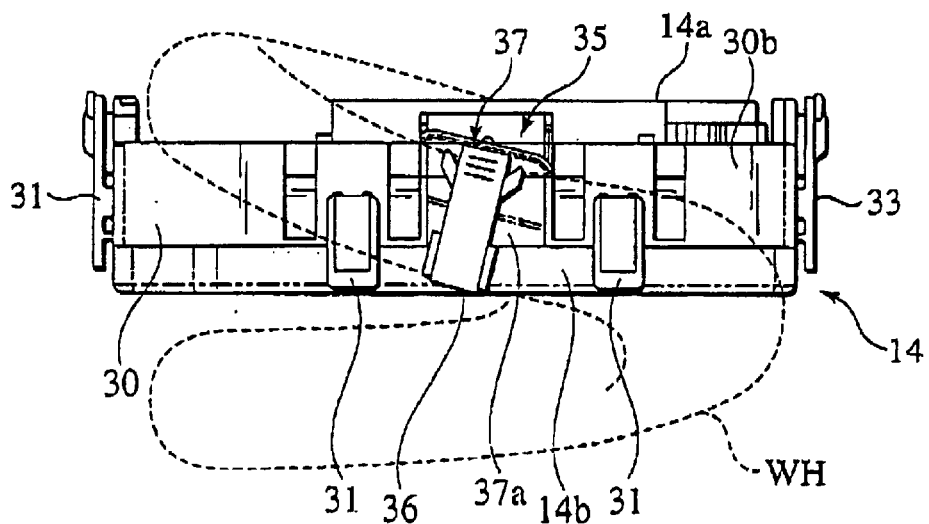
FIG. 14B is a rear elevation view illustrating the state of the junction box body in which the wire harness is fixed according to the second embodiment.

Specifically, as shown in FIG. 14A, the wire harness WH mounted on a connector mounting part 25 is inserted from a harness insertion slot positioned on the side of the surface opposed to a maintenance surface 14*a*. The wire harness WH passes through a space on the side opposed to the maintenance surface 14*a* and is led to the side of the maintenance surface 14*a* from the side of the rear surface 14*b*. The branched ends of the wire harness WH are then connected to the connector mounting parts 25, respectively.

The harness fixture 35 restricts the routing path of the wire harness WH in an oblique direction with respect to the longitudinal direction of the rear surface 14*b* by abutting the wire harness WH, which passes on the side of the rear surface 14*b*, along the harness restricting plate 37*a*. Moreover, due to the restriction of the wire harness WH in such routing path, the wire harness WH inserted from the insertion inlet slot is restricted in the routing path in which the wire harness WH is largely bent on the side opposed to the maintenance surface 14*a*. The routing path on the side of the maintenance surface 14*a* leads the wire harness WH to each connector mounting part 25 without passing through the path over fuse mounting parts 23 and the relay-mounting parts 24.

A maintenance inspection operation can be conducted in a similar manner to that in the first embodiment using the electrical junction box of this embodiment. Specifically, a maintenance inspector removes an upper cover 16 from a lower cover 15, and releases locks to the lower cover 15 to remove the junction box body 14 from the lower cover 15. Thereafter, checking of a fuse condition and replacement of the fuse are carried out.

As shown in FIG. 4, in order to conduct a complicated operation of maintenance inspection such as replacement of a relay and the junction box body 14, the junction box body 14 being drawn cut from the lower cover 15 is moved backward, orienting the rear surface 14b toward the side of the maintenance inspector, and then the harness clip 36 is detached. The wire harness WH is released from the routing restriction and becomes free. Thereafter, the junction box body 14 is drawn out and moved to a position near the maintenance inspector, and the maintenance inspection operation is carried out. After the operation is completely finished, the junction box body 14 is replaced to the waterproof cover 13 in the reverse procedure to that mentioned above, and thereby the whole procedure is completed.

As heretofore described, in the electrical junction box 10, the wire harness WH is fixed to the frame 30, which makes it possible to fix the end-side portion of the wire harness WH. In addition, the wire harness WH moves together with the junction box body 14 while the end-side portion of the wire harness WH is restricted by the routing. Therefore, the routing path of the end-side portion of the wire harness WH is certainly restricted without interfering with the sliding movement of the junction box body 14.

Moreover, the maintenance surface 14a is provided with the connector mounting parts 25 to which each end-side of the wire harness WH is connected, and the fuse mounting parts 23 on which each fuse is mounted. The harness fixture 35 restricts the routing path so that the wire harness WH does not pass over the fuse mounting parts 23 and is led to the connecting mounting parts 25. Therefore, it is possible to certainly prevent a situation in which the fuse cannot be viewed due to the wire harness WH, thus enabling easy checking of the fuse condition.

Furthermore, the harness fixture 37 is provided at the center of the rear surface 14b and restricts the routing path of the wire harness WH, which passes on the side of the rear surface 14b, in an oblique direction. Hence, the space on the side of the rear surface 14b is an effective space for accommodating the wire harness WH, which contributes to housing the extra-long portion of the wire harness WH within a small space.

Moreover, the harness fixture 35 is constituted by the harness clip 36 which holds the wire harness WH, and the harness fixing part 37 to which the harness clip 36 is fixed in the freely detachable manner. Therefore, when the junction box body 14 is drawn out from the lower cover 15, the harness clip 36 is detached from the junction box body 14 to release the routing path restriction of the wire harness WH, and thereby the junction box body 14 is drawn out with the wire harness WH being free. Accordingly, the extra-long portion of the wire harness WH can be shortened, resulting in a short dimension of the wire harness WH, a smaller accommodating space for the harness and the like. When the extra-long portion of the wire harness WH is long enough, the junction box body 14 can be drawn out from the lower cover 15 without detaching the harness clip 36. Therefore the operation for drawing out the junction box body 14 can be simplified.

Moreover, the wire harness WH is inserted into the lower cover 15 from the opposite side of the maintenance surface 14a. The wire harness WH is then routed through the space on the side opposed to the maintenance surface 14a, and is routed to the side of the maintenance surface 14a from the rear surface 14b. Therefore, the wire harness WH can be housed in a manner so that the junction box body 14 is surrounded by the wire harness WH. Accordingly, the extra-long portion of the wire harness WH can be housed within the waterproof cover 13 without difficulty.

In the above embodiment, the harness fixing part 37 is provided on the frame 30 which is attached to the circumference of the junction box body 14. However, the harness fixing part 37 may also be provided on the junction box body 14 itself.

The entire content of a Japanese Patent Application No. P2002-219753 with a filing date of Jul. 29, 2002 and a Japanese Patent Application No. P2002-231930 with a filing date of Aug. 8, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. An electrical junction box, comprising:

a junction box body; and a cover which houses and holds the junction box body, wherein a guide rail groove is provided on any one of an inner surface of the cover and an outer surface of the junction box body, and a guide rail guided by the guide rail groove is provided on the other thereof; and the junction box body is held in the cover at a slant with respect to the guide rail and the guide rail groove.

2. The electrical junction box of claim 1, further comprising:

a frame provided on a circumference of the junction box body, wherein any one of the guide rail groove and the guide rail is provided on an outer surface of the frame.

3. The electrical junction box of claim 2, wherein the guide rail groove is provided on an inner surface of the cover; and the guide rail is provided on an outer surface of the frame.

4. The electrical junction box of claim 1, wherein a fuse is mounted on a maintenance surface of the junction box body.

5. The electrical junction box of claim 2, wherein an arm lock is provided on the frame, and the arm lock is elastically deformed to be engaged with a projection of the junction box body so that the frame is attached to the junction box body.

6. The electrical junction box of claim 1, wherein the guide rail groove includes a straight groove part and a curved groove part.

7. The electrical junction box of claim 1, wherein a locking groove is provided on an inner side of the guide rail groove, and a lock projection engaged with the locking groove is provided on the side of the guide rail, in order to allow the cover to hold the junction box body.

8. The electrical junction box of claim 1, further comprising:

a wire harness fixing mechanism which fixes a part of a wire harness, which is connected to the junction box body, to a side of the junction box body.

* * * * *